United States Patent
Awata

[11] Patent Number: 5,866,228
[45] Date of Patent: Feb. 2, 1999

[54] VACUUM HEAT-INSULATOR

[75] Inventor: Mitsuru Awata, Yokohama, Japan

[73] Assignee: Mitsubishi Chemical Corporation, Tokyo, Japan

[21] Appl. No.: 873,758

[22] PCT Filed: Nov. 21, 1994

[86] PCT No.: PCT/JP94/01966

§ 371 Date: Sep. 22, 1995

§ 102(e) Date: Sep. 22, 1995

[87] PCT Pub. No.: WO95/14881

PCT Pub. Date: Jun. 1, 1995

Related U.S. Application Data

[63] Continuation-in-part of Ser. No. 491,923, Sep. 22, 1995, abandoned.

[30] Foreign Application Priority Data

Nov. 22, 1993 [JP] Japan .................................. 5-315870

[51] Int. Cl.$^6$ ...................................................... B32B 1/06
[52] U.S. Cl. ............................................. 428/69; 428/76
[58] Field of Search ..................... 428/69, 76; 220/421, 220/422

[56] References Cited

U.S. PATENT DOCUMENTS

| | | | |
|---|---|---|---|
| 4,162,924 | 7/1979 | Kubo et al. | 106/120 |
| 4,269,323 | 5/1981 | Ito et al. | 220/423 |
| 4,492,725 | 1/1985 | Ishihara et al. | 428/69 |
| 4,529,638 | 7/1985 | Yamamoto et al. | 428/316.6 |
| 4,669,632 | 6/1987 | Kawasaki et al. | 220/423 |

*Primary Examiner*—Alexander Thomas
*Attorney, Agent, or Firm*—McAulay Fisher Nissen Goldberg & Kiel, LLP

[57] ABSTRACT

A vacuum heat-insulator (6) formed by tightly packaging a shaped product comprising acicular crystals of calcium silicate entangled in a three dimensional manner in a reduced pressure state in a container (2), (3), (4) composed of a composite film formed by laminating a metal foil, or vapor-depositing a metal or metal oxide to a plastic film, and having a thermal conductivity at 20° C. of not more than 0.015 Kcal/m.hr.°C. This vacuum heat-insulator (6) brings about no environmental problems upon discarding caused by dusting, and is capable of displaying an excellent heat-insulating performance without using Freon.

7 Claims, 3 Drawing Sheets

VACUUM HEAT-INSULATOR

This is a continuation-in-part, of application Ser. No. 08/491,923, filed Sep. 22, 1995, now abandoned, which is a 371 of PCT/JP94/01966 filed Nov. 21, 1994.

TECHNICAL FIELD

The present invention relates to a vacuum heat-insulator, and more in particular, it relates to a vacuum heat-insulator improved so as to display an excellent heat-insulating performance by using a specified calcium silicate shaped product as a heat-insulating core material.

BACKGROUND ART

Freon-polyurethane foam heat-insulator utilizes low heat conductivity of Freon and has been used generally as an excellent heat-insulator. Since the use of Freon has been restricted in recent years, a heat-insulator capable of exhibiting an excellent heat-insulating performance without using Freon has been demanded.

The preparation of a heat-insulator has recently been provided, prepared by incorporating fine inorganic particles such as silica powder as a heat-insulating core material into a flexible container (bag) having gas barrier property, then evacuating the inside of the container to a reduced pressure state, thereby closely adhering the fine inorganic particles to the container, and sealing the container.

For example, in the case where such a vacuum heat-insulator is used in a refrigerator or device for cool storage or for cold preserving storage, it is preferred that the thermal conductivity at 20° C. of the vacuum heat-insulator be 0.005 to 0.008 Kcal/m·hr·°C. When the thermal conductivity is more than 0.008 Kcal/m·hr·°C., excess electric power and current is required for maintaining the cold storage temperature. If a vacuum heat-insulator having a larger thermal conductivity is used, a much more thicker heat-insulator must necessarily be used, undesirably reducing the size of the storage area.

However, the vacuum heat-insulator described above involves a problem of emitting powdery dusts upon discarding to bring about an environmental problem. The present invention has been accomplished in view of the foregoing situations and an object thereof is to provide a novel vacuum heat-insulator bringing about no environmental problem caused by dusting upon discarding and capable of exhibiting an excellent heat-insulating performance without using Froen, as well as a method of preparing the same.

DISCLOSURE OF THE INVENTION

Figure 1:
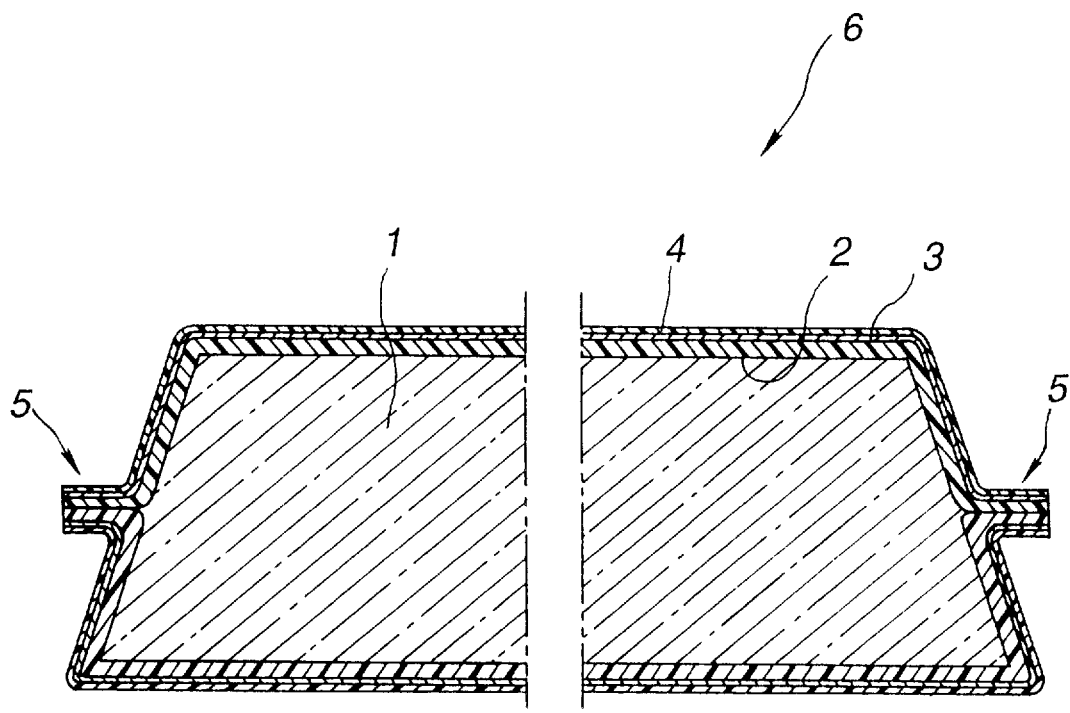
FIG. 1 is an explanatory cross sectional view illustrating an example of a vacuum heat-insulator according to the present invention.

For attaining the foregoing object, while studying the performance of the vacuum heat-insulator, it was discovered that selection of a heat-insulating core material enabling easy evacuation and capable of attaining highly reduced pressure state is essential. Then, as a result of a further study on the basis of such a finding, it has been discovered that a specified calcium silicate shaped product among inorganic shaped products, is excellent as the heat-insulating core material and the present invention has been accomplished.

The present invention has been accomplished on the basis of the above-mentioned finding, and in accordance with a first aspect of the present invention, there is provided a vacuum heat-insulator formed by tightly packaging a shaped product comprising acicular crystals of calcium silicate entangled in a three dimensional manner in a reduced pressure state in a container composed of a composite film formed by laminating a metal foil or vapor-depositing a metal or metal oxide to a plastic film, and having a thermal conductivity at 20° C. of not more than 0.015 Kcal/m·hr·°C.

In accordance with a second aspect of the present invention, there is provided a vacuum heat-insulator embedded to the inside of a polyurethane foam shaped product.

In accordance with a third aspect of the present invention, there is provided a method of preparing a vacuum heat-insulator, which comprises disposing a vacuum heat-insulator as described above in a space in which a heat-insulator is to be applied, and then injecting polyisocyanate and polyol under foaming conditions into a remaining portion of the space to foam and cure polyurethane.

The present invention will be explained more in details with reference to the accompanying drawings.

At first, a calcium silicate shaped product used in the vacuum heat-insulator according to the present invention will be explained. In the present invention, a shaped product (1) comprising acicular crystals of calcium silicate entangled in a three dimensional manner is used as a heat-insulating core material. The calcium silicate shaped product is known per se.

A greatest feature of the present invention is to select the specified calcium silicate shaped product as the heat-insulating core material by the following reasons. Namely, the vacuum heat-insulator is usually produced by using a vacuum packaging machine and tightly packaging the heat-insulating core material under a reduced pressure state in a flexible container having a gas barrier property. The shaped product formed by entangling the acicular crystals of calcium silicate in a three dimensional manner can easily attain the reduced pressure state required for obtaining low thermal conductivity due to open-spaces present in a considerable volume in the shaped product.

The calcium silicate shaped product used in the present invention is prepared, basically, by dispersing a siliceous material and a calcareous material in water, applying hydrothermal reaction under heating to obtain an aqueous slurry containing calcium silicate hydrate, subjecting the aqueous slurry to pressfilter-molding, and drying or steam curing (or steam aging) and drying the molded material.

As the siliceous material, either amorphous or crystalline material may be used and there can be exemplified, specifically, natural products such as diatomaceous earth, quartzite and quartz. In addition, there can be also exemplified industrial by-products such as silicon dust and silica obtained by reaction between hexafluorosilicic acid formed as a by-produced in a wet process for producing phosphoric acid and aluminum hydroxide. As the calcareous material, quick lime, slaked lime, carbide waste or the like can be exemplified.

Usually, the calcareous material is used after being prepared as a lime milk (or slaked lime slurry) containing bulky lime particles. Such lime milk can be prepared with reference to numerous known literatures, for example, Japanese Patent Publication No. 55-29952. The above-mentioned publication discloses a lime milk having a sedimentation volume of not less than 45 ml. The sedimentation volume represents a sedimentation volume of slaked lime particles (ml) formed by moderately or quietly injecting 50 ml of a lime milk into a cylindrical container having 1.3 cm in diameter and not less than 50 cm$^3$ in volume and then measuring after standing still for 20 min.

Upon hydrothermal reaction, the amount of water is not less than 15 times by weight based on a solid content (content of the siliceous material and calcareous material). The hydrothermal reaction is carried out under a heating condition of a saturated steam pressure of not lower than 10 Kg/cm$^2$ for 1 to 5 hours and an aqueous slurry containing calcium silicate hydrate can be obtained by the hydrothermal reaction.

The aqueous slurry is subjected to pressfilter-molding by utilizing, for example, a filter press. It can be molded into panels or pipes having various shapes depending on the shape of a dehydrating portion in a pressfilter molding machine. Drying after pressfilter-molding or drying after steam-curing is usually conducted at a temperature from 150° to 200° C. for 5 to 30 hours, and the steam-curing before drying can usually be conducted under the same conditions as those for the hydrothermal reaction.

In the shaped product obtained by the method described above, acicular crystals of calcium silicate are entangled in a three dimensional manner and it has high specific strength if the foregoing conditions for the hydrothermal reaction are satisfied. Specifically, the shaped product has an apparent density of 0.02 to 0.09 g/cm$^3$, and a compression strength usually of not less than 1 kg/cm$^2$ and, specifically from 2 to 6 kg/cm$^2$.

The shaped product having the low apparent density as described above can overcome the drawbacks of the existent vacuum heat-insulator wherein fine inorganic particles are used as the heat-insulating core material, that the apparent density is as high as from 0.28 to 0.30 g/cm$^3$ and the weight is more than about 10 times as much as of the Freon-foamed polyurethane heat-insulator, and a light-weight vacuum heat-insulator as comparable with the Freon-foamed polyurethane heat-insulator can be realized.

The acicular crystals of calcium silicate are mainly composed of tobermorite crystals, xonotlite crystals or mixture of such crystals. Such a crystal system can be adjusted by CaO/SiO$_2$ molar ratio in the hydrothermal synthesis reaction. Usually, CaO/SiO$_2$ molar ratio is in a range of about 0.8 to 1.2, and xonotlite crystals are formed predominantly according as the CaO/SiO$_2$ molar ratio increases.

In a preferred embodiment of the present invention, acicular crystals of calcium silicate are crystals having a plurality of whiskers at the surface of a shell having a coarse inside or a hollow inside. Usually, the outer diameter of the shell is from 10 to 120 μm and the length of the whisker is 1 to 20 μm. Further, in a particularly preferred embodiment of the present invention, the acicular crystals of calcium silicate are crystals in which the shell itself is further grown into needles and which have a plurality of whiskers at the surface of the mesh-like shell. These crystal structure is obtained by using a siliceous material at high purity, and the crystal structure having the mesh-like shell can be obtained by using a siliceous material containing an predominant amount of an amorphous material.

In another preferred embodiment of the present invention, the calcium silicate shaped product constituting the heat-insulating core material contains a radiation energy absorbent. As the radiation energy absorbent, silicon carbide, titanium oxide or the like can be used suitably. The radiation energy absorbent is used usually in the form of fine particles of 0.5 to 30 μm in size, which are added in a production step for the calcium silicate shaped product, for example, into an aqueous slurry containing calcium silicate hydrate. The content of the radiation energy absorbent in the calcium silicate shaped product is usually from 0.5 to 20% by weight.

Then, a container (bag) used for the vacuum heat-insulator according to the present invention will be explained.

In the present invention, as the constituent material for the container, a composite film formed by laminating a metal foil, or vapor-depositing a metal or metal oxide to a plastic film is used. Such a composite film has gas barrier property and flexibility. Usually, the container has a cylinder opened at both ends.

Various films can be used for the plastic film so long as they have flexibility. For instance, polyester film, polypropylene film or the like can be used suitably. Further, films having an excellent gas barrier property such as a vinylidene chloride-based resin film, vinylidene fluoride resin-coated film or the like is also suitable.

As the metal foil, an aluminum film can be exemplified typically. As the metal or the metal oxide used for vapor deposition, aluminum, silicon oxide, magnesium oxide or the like can be exemplified typically. In a case of forming a composite film obtained by vapor-depositing the metal oxide, a polyvinyl alcohol-based film can be used suitably.

The composite film may have a two-layered structure but a three-layered structure having plastic films disposed on both sides of the metal layer or the metal oxide layer is preferred. In the composite film of the three-layered structure, a film of excellent scratch resistance (for example, polyester film) is used for the outer-layer film, while a film of excellent heat sealing property (for example, polypropylene film) is used for the inner-layer film.

The vacuum heat-insulator according to the present invention is manufactured by incorporating a calcium silicate shaped product in a container and then evacuating the inside of the container to a reduced pressure state, thereby tightly packaging the shaped product under the reduced pressure state. Specifically, the shaped product is disposed to a central portion of a cylindrical container opened at both ends, the resultant cylindrical container is then contained in a vacuum packaging machine and subjected to evacuation, and both ends of the container are heat-sealed when a predetermined vacuum degree is reached. In this instance, the evacuation can be applied easily because of a open-space structure due to a three dimensional entanglement of acicular crystals of the calcium silicate shaped product, and highly reduced pressure state (for example, 0.07 Torr G) can be obtained easily. As a result, the vacuum heat-insulator according to the present invention can display an excellent heat-insulating performance. Specifically, the thermal conductivity at 20° C. is usually not more than 0.015 Kcal/m·hr·°C. preferably not more than 0.0078 Kcal/m·hr·°C., more preferably not more than 0.0072 Kcal/m·hr·°C. and one example of the measured value is 0.006 to 0.007 Kcal/m·hr·°C. Such a value is about ⅓ of the Freon-polyurethane foam heat-insulator.

The vacuum heat-insulator (6) illustrated in FIG. 1 is obtained by tightly packaging a calcium silicate shaped product (1) under a reduced pressure state by a container of three-layered structure. In FIG. 1, are shown a plastic film layer (2) constituting the container, a metal layer (3) constituting the container, a plastic film layer (4) constituting the container and a seal portion (5) of the container.

In a preferred embodiment of the present invention, the calcium silicate shaped product is subjected to a heat-treatment at a temperature not lower than 300° C. before tightly packaging, specifically, at a temperature of 300 to 500° C. usually for 1 to 5 hours. By the heat-treatment, moisture adsorbed to the calcium silicate shaped product is removed and highly reduced pressure can be attained. The reduced pressure is usually not more than 1 Torr G, preferably not more than 0.1 Torr G.

Figure 2:
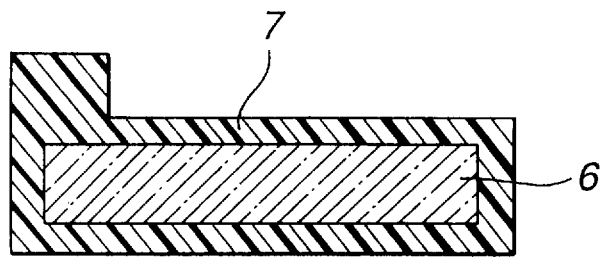
FIG. 2 is an explanatory cross sectional view illustrating another example of a vacuum heat insulator according to the present invention.

In the present invention, as shown in FIG. 2, the vacuum heat-insulator (6) can be used being embedded at the inside of a polyurethane foam shaped product (7). The vacuum heat-insulator (6) embedded to the inside of the foamed polyurethane shaped product (7) has a merit that the vacuum heat-insulator (6) can be fabricated easily in a space of a complicated shape by taking an advantage that the polyurethane foam shaped product (7) can be molded into various shapes. Further, the vacuum heat-insulator (6) can be protected by the polyurethane foam shaped product (7) and the size of the material can be enlarged easily.

As a method of embedding the vacuum heat-insulator to the inside of the polyurethane foam shaped product, for example, a method comprising fixing the vacuum heat-insulator about at a central portion in a molding die for a polyurethane foam shaped product by an appropriate means, and injecting polyisocyanate and polyol under foaming conditions into the die to foam and cure polyurethane. Further, a method comprising molding a plurality of polyurethane foam shaped products having a fitting portion for the vacuum heat-insulator and embedding the vacuum heat-insulator by assembling them can also be employed. Polyisocyanate and polyol used can be properly selected from known compounds and the foaming conditions can be determined, for example, by water or pentane added in a small amount to polyol. The catalyst for urethane polymerization, crosslinking agent or the like can also be selected properly from known compounds.

Figure 3:
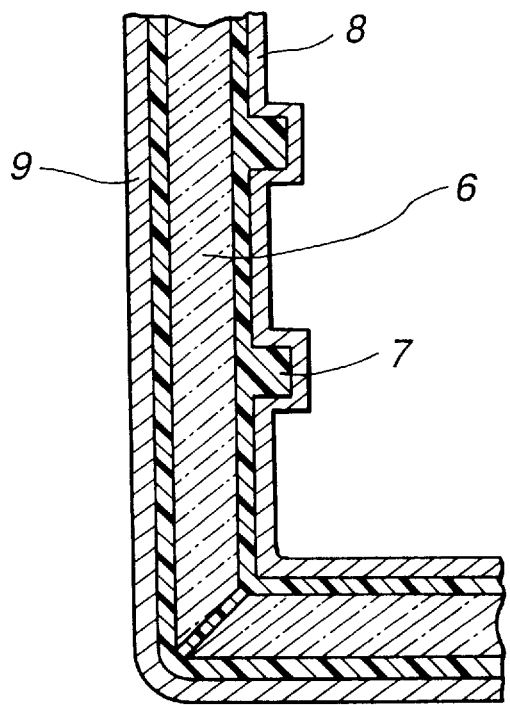
FIG. 3 is an explanatory cross sectional view illustrating an example of a method of preparing a vacuum heat insulator according to the present invention, in which are shown a calcium silicate shaped product (1), a plastic film layer (2) constituting a container, a metal layer (3) constituting the container, a plastic film layer (4) constituting the container, a sealed portion (5) of the container, a vacuum insulator (6), a polyurethane foam molded product (7), an inner wall (8) and an outer wall (9)

The heat-insulator according to the present invention is usually disposed in a space in which the heat-insulator is to be applied. In this case, the heat-insulator is applied, as shown in FIG. 3, by a method comprising disposing the vacuum heat-insulator (6) in a space defined with an inner wall (8) and an outer wall (9), and then injecting polyisocyanate and polyol under foaming conditions into a remaining portion of the space to foam and cure. In FIG. 3, reference numeral (7) represents a polyurethane foam shaped product to be formed by foaming and curing polyurethane. The application method is excellent for applying the vacuum heat-insulator into a complicate space as shown in FIG. 3 since the polyurethane foam can be foamed throughout the space in which the heat insulting material is to be applied.

The vacuum heat-insulator according to the present invention can be used suitably as a heat-insulator, for example, for electric refrigerator, refrigerator truck, refrigerating car or the like.

BEST MODE FOR PRACTICING THE INVENTION

The present invention will be explained more specifically by way of preferred embodiments but it should be noted that the present invention is not limited only to the following embodiments unless it does not exceed the scope thereof.

EXAMPLE 1

496 parts by weight of warm water were added to 49.6 parts by weight of quick lime (CaO: 96.2 wt %) to conduct hydration, thereby obtaining a lime milk (or slaked lime slurry) of 46 ml of sedimentation volume. The sedimentation volume of the lime milk represents a sedimentation volume (ml) of lime particles measured by quietly pouring 50 ml of a lime milk into a cylindrical container of 1.3 cm in diameter and not less than 50 cm$^3$ in volume and standing still for 10 min (hereinafter the same).

Then, after adding 50.4 parts by weight of ground quartz ($SiO_2$: 96.4 wt %) having an average particle size of 10 $\mu$m to the lime milk, water was added such that the total amount of water is 35 weight times as large as of the solid content. $CaO/SiO_2$ molar ratio is 1.05.

The thus obtained liquid suspension was stirred and reacted in an autoclave for 3 hours under the conditions of 15 Kg/cm$^2$ and 200° C. to obtain an aqueous slurry of calcium silicate hydrate mainly composed of xonotlite.

Then, one part by weight of glass fibers and one part by weight of pulp were admixed as reinforcing fibers to 100 parts by weight of the aqueous slurry, the resultant mixture was supplied to a filter press machine to apply pressfilter-molding, thereby obtaining a shaped product of a trapezoidal cross section, having 200 mm in length, 200 mm in width and 20 mm in thickness, and then the obtained shaped product was dried at 150° C. for 8 hours. The resultant calcium silicate shaped product had an apparent density of 0.066 g/cm$^3$ and a compression strength of 2.8 Kg/cm$^2$.

Figure 4:
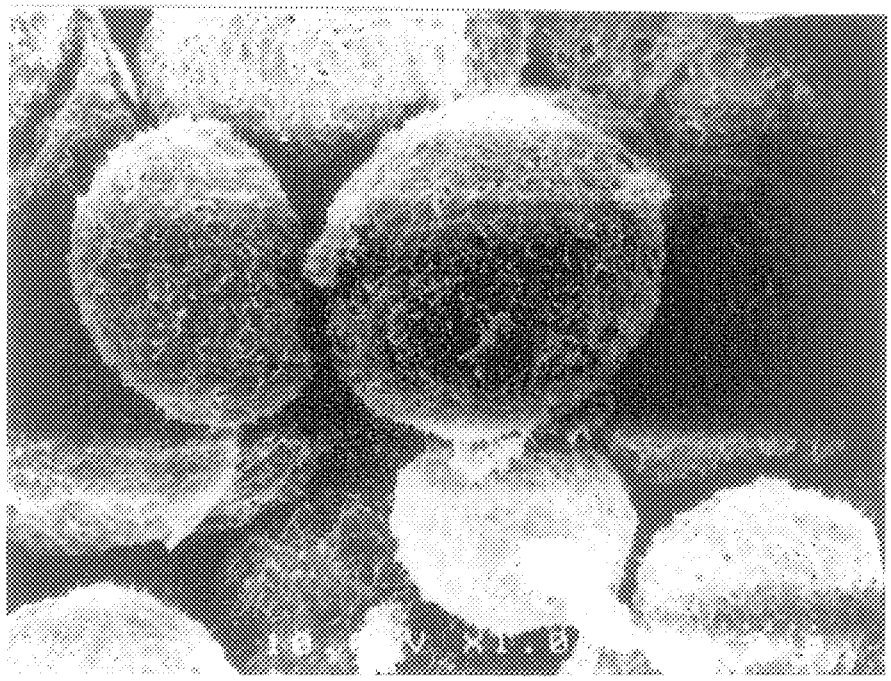
FIG. 4 shows a photograph at 1,000×magnification of calcium silicate crystals obtained in Example 1.

As is seen in FIG. 4, crystals constituting the calcium silicate shaped product were acicular crystals having a plurality of whiskers on the surface of a shell. Then, as a result of separate photographic measurement of the freely fractured shaped product, it was found that the inside of the shell of the acicular crystal was coarse or hollow.

Then, the shaped product was disposed about at a central portion of a cylindrical container opened on both ends composed of a laminate film having a constitution of polyethylene terephthalate film (12 $\mu$m)/aluminum foil (9 $\mu$m)/polypropylene film (60 $\mu$m), the obtained cylindrical container was contained in a vacuum packaging machine having a performance of vacuum chamber of 20 liter volume and exhaustion amount of 500 liter/min, and then evacuation was conducted. Then, when the pressure in the vacuum chamber reached 0.07 Torr G, both opening ends of the container were heat-sealed to apply tightly packaging, thereby obtaining a vacuum heat-insulator of a structure shown in FIG. 1 having the calcium silicate shaped product as the heat-insulating core material. In the laminate film, the polypropylene film layer was used as the inner side of the container.

The thermal conductivity of the vacuum heat-insulator was 0.0088 Kcal/m·hr·°C. which was much lower as compared with the thermal conductivity of 0.013 Kcal/m·hr·°C. of a usual polyurethane heat-insulator obtained by Freon-foaming. The thermal conductivity is a value measured at 20° C. (hereinafter the same).

EXAMPLE 2

An aqueous slurry of calcium silicate hydrate comprising xonotlite as the main ingredient obtained in the same manner as in Example 1 was used, reinforcing fibers were added in the same manner as in Example 1, and pressfilter-molding was conducted to form a molded product of an identical shape with that in Example 1 which was dried at 150° C. for 8 hours. Then, three kinds of calcium silicate shaped products of different apparent densities were obtained by controlling the amount of the aqueous slurry supplied to the filter press machine. The results of measurement of the apparent density and the compression strength for each of the shaped products were as shown in Table 1.

Then, for completely removing deposited moisture in each of the shaped products, the products were dried at 300° C. for 5 hours and then tightly packaged respectively in the same manner as in Example 1 to obtain a vacuum heat-insulator of a structure shown in FIG. 1 having the calcium silicate shaped product as the heat-insulating core material. Results of the measurement for the thermal conductivity of the vacuum heat-insulators were as shown in Table 1.

EXAMPLE 3

496 parts by weight of warm water were added to 49.6 parts by weight of quick lime (CaO: 96.2 wt %) to conduct hydration, thereby obtaining a lime milk of 48 ml of sedimentation volume. After adding 50.4 parts by weight of ground quartz ($SiO_2$: 96.4 wt %) having an average particle size of 10 μm to the lime milk, water was added such that the total amount of water 40 weight times as large as of the solid content. $CaO/SiO_2$ molar ratio is 1.05.

The thus obtained liquid suspension was stirred and reacted in an autoclave for 2 hours under the conditions of 15 Kg/cm² and 200° C. to obtain an aqueous slurry of calcium silica hydrate mainly composed of C—S—H(1).

One part by weight of glass fibers and one part by weight of pulp were admixed as reinforcing fibers to 100 parts by weight of the aqueous slurry, the resultant mixture was supplied to a water filter press machine to apply pressfilter-molding, thereby obtaining a molded product of the same size as in Example 1. The molded product was subjected to stream curing under the conditions of 10 Kg/cm² and 180° C. to convert C—S—H(1) into xonotlite and then dried at 150° C. for 7 hours. The resultant calcium silicate shaped product had apparent density and compression strength as shown in Table 1.

Then for completely removing moisture deposited to the shaped product, the product was dried at 300° C. for 5 hours, and then was packaged tightly in the same manner as in Example 1 to obtain a vacuum heat-insulator of a structure shown in FIG. 1 having the calcium silicate shaped product as the heat-insulating core material. The results of measurement for the thermal conductivity of the vacuum heat-insulator as shown in Table 1.

TABLE 1

|  | Calcium silicate shaped product material | | Vacuum heat insulating |
|---|---|---|---|
|  | Apparent density (g/cm³) | Compression strength (kg/cm²) | Thermal conductivity (Kcal/m·hr·°C.) |
| Example 1 | 0.066 | 2.8 | 0.0088 |
| Example 2-1 | 0.082 | 3.7 | 0.0110 |
| Example 2-2 | 0.053 | 1.9 | 0.0078 |
| Example 2-3 | 0.043 | 1.3 | 0.0072 |
| Example 3 | 0.038 | 1.1 | 0.0064 |

Industrial Applicability

As has been described above according to the present invention, a highly reduced pressure state can be obtained by selecting specified calcium silicate shaped products as the heat-insulating core material for the vacuum heat-insulator, and as a result, a novel vacuum heat-insulator capable of displaying an excellent heat-insulating performance is provided. Further, since the heat-insulating core material used in the present invention is a shaped product, it bring about no environmental problems upon discarding caused by dusting such as in the case of powdery products. Accordingly, the present invention has a remarkable industrial value, particularly, in a situation in which the use of Freon is restricted.

I claim:

1. A vacuum heat-insulator formed by tightly packaging a shaped product comprising acicular crystals of calcium silicate entangled in a three dimensional manner in a reduced pressure state in a container composed of a composite film formed by laminating a metal foil or vapor-depositing a metal or metal oxide to a plastic film, and having a thermal conductivity at 20° C. of not more than 0.0078 Kcal/m.hr.°C., the calcium silicate shaped product having an apparent density of from 0.02 to about 0.08 g/cm³, the acicular crystals of calcium silicate being a mixture of tobermorite crystals and xonotlite crystals.

2. A vacuum heat-insulator as defined in claim 1, wherein the acicular crystals of calcium silicate are crystals having a plurality of whiskers on the surface of a shell having a coarse or hollow inside.

3. A vacuum heat-insulator as defined in claim 1, wherein the acicular crystals of calcium silicate are crystals having a plurality of whiskers at the surface of a mesh-like shell.

4. A vacuum heat-insulator as defined in claim 1, wherein the calcium silicate shaped product contains a radiation energy absorbent material.

5. A vacuum heat-insulator as defined in claim 1, wherein the heat-insulator is embedded at the inside of a polyurethane foam shaped product.

6. A method of applying a vacuum heat-insulator, which comprises disposing a vacuum heat-insulator as defined in claim 1 in a space in which a heat-insulator is to be applied, and then injecting polyisocyanate and polyol under foaming conditions into a remaining portion of the space to foam and cure.

7. A vacuum heat-insulator as defined in claim 1 wherein the calcium silicate shaped product is heat treated at a temperature not lower than 300° C. before tightly packaging.

* * * * *